United States Patent
Zhang et al.

(10) Patent No.: US 11,945,167 B1
(45) Date of Patent: Apr. 2, 2024

(54) THREE-DEGREE-OF-FREEDOM CONVENIENT MOBILE POWDER RECOVERY DEVICE AND RECOVERY METHOD

(71) Applicant: UNIVERSITY OF SCIENCE AND TECHNOLOGY BEIJING, Beijing (CN)

(72) Inventors: Pei Zhang, Beijing (CN); Xiaoming Wang, Beijing (CN); Benli Luan, Beijing (CN); Min Jiang, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 18/295,578

(22) Filed: Apr. 4, 2023

(30) Foreign Application Priority Data

Dec. 15, 2022 (CN) .......................... 202211613238.2

(51) Int. Cl.
*B29C 64/357* (2017.01)
*B07B 1/00* (2006.01)
*B07B 1/28* (2006.01)
*B22F 10/73* (2021.01)

(52) U.S. Cl.
CPC ............ *B29C 64/357* (2017.08); *B07B 1/005* (2013.01); *B07B 1/28* (2013.01); *B22F 10/73* (2021.01)

(58) Field of Classification Search
CPC . B07B 1/005; B07B 1/28; B22F 10/73; B29C 64/357

USPC .......................................................... 209/3
See application file for complete search history.

(56) References Cited

U.S. PATENT DOCUMENTS 3,826,015 A * 7/1974 Kuroyama ................ F28C 3/16
209/474

FOREIGN PATENT DOCUMENTS

| CN | 102785077 A | * | 11/2012 |
| CN | 102785077 A | | 11/2012 |
| CN | 204194799 U | * | 3/2015 |
| CN | 204194799 U | | 3/2015 |
| CN | 206121963 U | * | 4/2017 |
| CN | 206121963 U | | 4/2017 |

* cited by examiner

*Primary Examiner* — Terrell H Matthews
(74) *Attorney, Agent, or Firm* — Nitin Kaushik

(57) ABSTRACT

The present disclosure relates to a three-degree-of-freedom convenient mobile powder recovery device and a recovery method. The three-degree-of-freedom convenient mobile powder recovery device includes: a powder recovery module, a three-degree-of-freedom adjusting module and a drying and sieving module, wherein the powder recovery module is arranged on the three-degree-of-freedom adjusting module and used to recover powder; and the drying and sieving module is arranged on the three-degree-of-freedom adjusting module, connected to the powder recovery module and used to dry and sieve powder recovered by the powder recovery module. The three-degree-of-freedom convenient mobile powder recovery device has a simple structure, which is convenient to be operated. The height and position of the three-degree-of-freedom convenient mobile powder recovery device can be adjusted automatically, so that the recovery device is suitable for the setting of laser processing systems with various heights in the telescopic range.

10 Claims, 3 Drawing Sheets

THREE-DEGREE-OF-FREEDOM CONVENIENT MOBILE POWDER RECOVERY DEVICE AND RECOVERY METHOD

CROSS-REFERENCE TO RELATED APPLICATIONS

The application claims priority to Chinese patent application No. 2022116132382, filed on Dec. 15, 2022, the entire contents of which are incorporated herein by reference.

TECHNICAL FIELD

The present disclosure belongs to the field of laser melting deposition powder recovery, and in particular, relates to a three-degree-of-freedom convenient mobile powder recovery device and a recovery method.

BACKGROUND

Laser melting deposition (LMD) technology is a "near-net forming" process. Compared with the traditional manufacturing method, the laser melting deposition technology has a fine structure and can meet the requirements of parts with complex structures and high dimensional accuracy. However, the laser melting deposition has low powder utilization rate, so that the manufacturing cost is high, and thus the development of the laser melting deposition technology is greatly limited. The phenomena of powder splashing and burning are often accompanied in the laser melting deposition process, and the powder affected by the heat of a molten pool will change in shape, components and particle size distribution, so that the possibility of reusing the powder is greatly reduced. Furthermore, the unused powder is scattered around a forming piece after the deposition, resulting in great waste of resources and environmental pollution. With the increasing production requirement of the laser melting deposition market and the rising price of energy, it is urgent to research and develop a convenient mobile powder recovery device to collect powder that is unused in the laser deposition process and to recover unused powder generated by various devices, thereby preventing the unused powder from being polluted by dust and simplifying the powder recovery treatment process.

SUMMARY

To overcome the above problems in the prior art, the present disclosure provides a three-degree-of-freedom convenient mobile powder recovery device and a recovery method, so as to solve the above problems in the prior art.

A three-degree-of-freedom convenient mobile powder recovery device includes: a powder recovery module, a three-degree-of-freedom adjusting module and a drying and sieving module, wherein
the powder recovery module is arranged on the three-degree-of-freedom adjusting module and used to recover powder;
the three-degree-of-freedom adjusting module is used to adjust the position of the powder recovery module, so that the powder recovery module can transversely and/or longitudinally move in a horizontal plane and move up and down vertically in a vertical plane; and
the drying and sieving module is arranged on the three-degree-of-freedom adjusting module, connected to the powder recovery module and used to dry and sieve powder recovered by the powder recovery module.

According to the above aspect and any possible implementation manner, an implementation manner is further provided: the powder recovery module includes an enclosing plate, a workbench and a powder-collecting funnel, wherein the size of the enclosing plate is capable of being adjusted according to requirements; the workbench is arranged in the enclosing plate; and the powder-collecting funnel is arranged on a lower side of the workbench.

According to the above aspect and any possible implementation manner, an implementation manner is further provided: the three-degree-of-freedom adjusting module includes a transverse telescopic frame, a longitudinal lifting frame and a driving module, wherein the transverse telescopic frame and the longitudinal lifting frame are connected by several guide connecting plates; and the driving module is arranged on the longitudinal lifting frame.

According to the above aspect and any possible implementation manner, an implementation manner is further provided: a sliding rail is arranged on the longitudinal lifting frame, and a sliding block is arranged in the sliding rail; one end of each of the guide connecting plates is fixedly connected to the sliding block, and the other end of each of the guide connecting plates is fixedly connected to the transverse telescopic frame; and
a sliding rail is arranged on the transverse telescopic frame, and a sliding block is arranged on the sliding rail: and the powder recovery module is connected to the sliding block, so that the powder recovery module moves along a direction of the sliding rail in the horizontal plane together with the sliding block.

According to the above aspect and any possible implementation manner, an implementation manner is further provided: the driving module includes a first motor, a transmission rod and a screw rod, wherein the first motor is arranged on the longitudinal lifting frame; one end of the transmission rod is connected to the first motor, and the other end of the transmission rod is connected to one end of the screw rod; and the other end of the screw rod is fixed on the transverse telescopic frame.

According to the above aspect and any possible implementation manner, an implementation manner is further provided: at least four fixing rings are arranged on the sliding rail of the transverse telescopic frame and used to fix the powder recovery module to a certain horizontal position; and at least four horizontal adjusting knobs are arranged below the transverse telescopic frame and used to perform fine adjustment on the longitudinal position of the powder recovery module.

According to the above aspect and any possible implementation manner, an implementation manner is further provided: the three-degree-of-freedom adjusting module further includes a bottom plate; the transverse telescopic frame, the longitudinal lifting frame and the drying and sieving module are placed on the bottom plate; and several Foma wheels are arranged at the bottom of the bottom plate, so that the three-degree-of-freedom convenient mobile powder recovery device is moveable along a direction perpendicular to the length of the sliding rail in the horizontal plane.

According to the above aspect and any possible implementation manner, an implementation manner is further provided: the drying and sieving module includes a drying submodule and a sieving submodule, wherein the drying submodule includes a drying box; a powder inlet, an electrostatic eliminator, a second motor, a stirring rod and stirring blades are arranged in the drying box, wherein, the upper end of the stirring rod is connected to the second motor, and the stirring blades are arranged at the lower end of the stirring rod; the sieving submodule includes a vibrating screen; a sieve, springs, a third motor, a powder outlet and an impurity outlet are arranged on the vibrating screen; the third motor is located at the lowermost part of the vibrating screen, and connected to a main body of the vibrating screen by the spring; the sieve is located below the drying box; the impurity outlet is located above the sieve; and the powder outlet is located below the sieve.

According to the above aspect and any possible implementation manner, an implementation manner is further provided: an induction heating coil is arranged in the drying box and used to heat powder.

The present disclosure further provides a recovery method of the three-degree-of-freedom convenient mobile powder recovery device. The method is performed by the three-degree-of-freedom convenient mobile powder recovery device and includes the following steps:

S1: adjusting the height of the recovery device according to the height and position of a laser melting deposition system required to recover powder, and adjusting a powder recovery module to an appropriate position in a horizontal direction; then adjusting a workbench to be located at a horizontal position, and starting a recovery operation;

S2: in the recovery process, stopping the recovery device immediately in the case of abnormality; under the normal situation, continuously collecting powder, moving the powder recovery module to be located over a drying and sieving module after collection, conveying the powder by the powder recovery module to a drying box of the drying and sieving module through a hose, and turning on a second motor for stirring and drying; and S3: conveying the stirred and dried powder onto a sieve of a vibrating screen, adjusting the vibrating screen to sieve the powder, and allowing the sieved powder to flow out of a powder outlet for storage.

The beneficial effects of the present disclosure:

Compared with the prior art, the present disclosure has the following beneficial effects: the three-degree-of-freedom convenient mobile powder recovery device has a simple structure, which is convenient to be operated, and capable of recovering the powder that is not utilized in the laser melting deposition process effectively. The height and position of the three-degree-of-freedom convenient mobile powder recovery device can be adjusted automatically, so that the recovery device is suitable for the setting of laser processing systems with various heights in the telescopic range. The laser melting processing process is performed in the powder collecting device, so that pollution to the powder by the external environment is reduced; drying and sieving treatment can be performed directly after collection, and the whole process from collecting to reusing for the polluted powder is highly integrated, so that the recovery process is greatly simplified and the powder recovery rate is increased; meanwhile, the working environment is purified, and the physical health of operators is ensured.

DETAILED DESCRIPTION OF THE EMBODIMENTS

To better understand the technical solution of the present disclosure, the content of the present disclosure includes but is not limited to the following specific embodiments, and similar technologies and methods should be regarded as within the protection scope of the present disclosure. To make the technical problems to be resolved, technical solutions, and advantages in the present disclosure clearer, the following provides detailed descriptions with reference to the accompanying drawings and specific embodiments.

It should be clear that the embodiments described in the present disclosure are merely a part rather than all of the embodiments of the present disclosure. All other embodiments obtained by a person of ordinary skill in the art based on the embodiments of the present disclosure without creative efforts shall fall within the protection scope of the present disclosure.

Terms used in the embodiments of the present disclosure are only for describing specific embodiments, and are not intended to limit the present disclosure. As used in the embodiments of the present application and the appended claims, the singular forms "a", "said" and "the" are intended to include the plural forms, unless the context clearly indicates other meanings.

Figure 1:
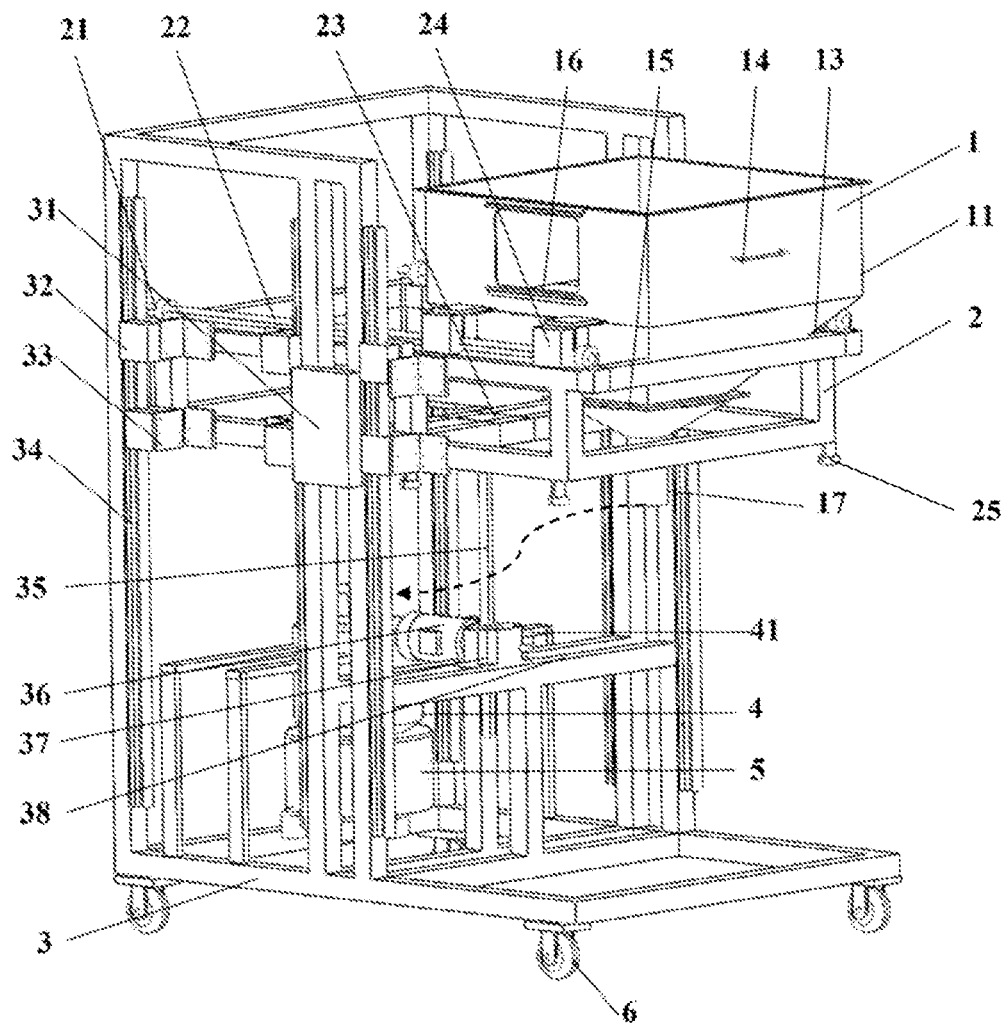
FIG. 1 is a structural diagram of a device according to the present disclosure.
Figure 2:
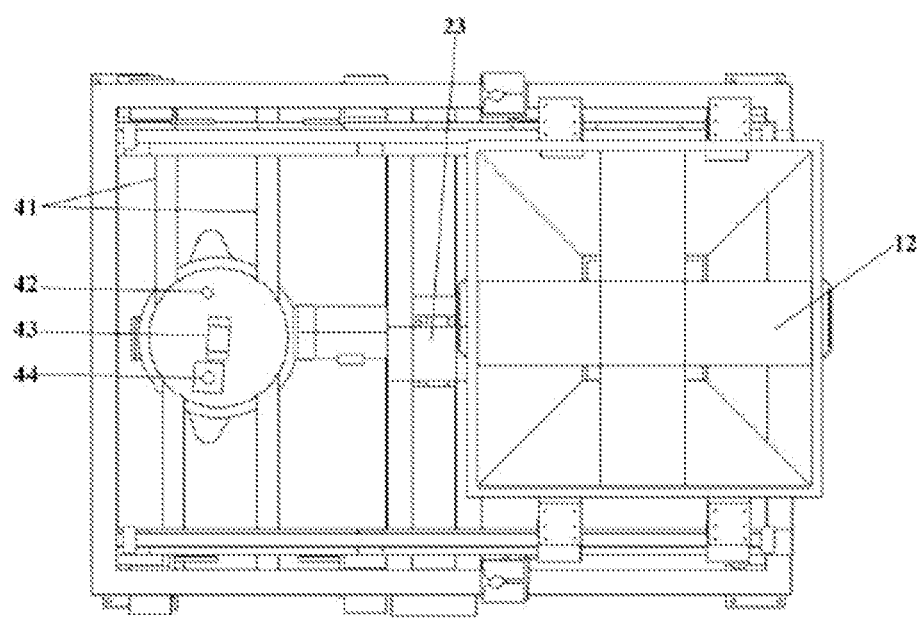
FIG. 2 is a top view of a device according to the present disclosure.
Figure 3:
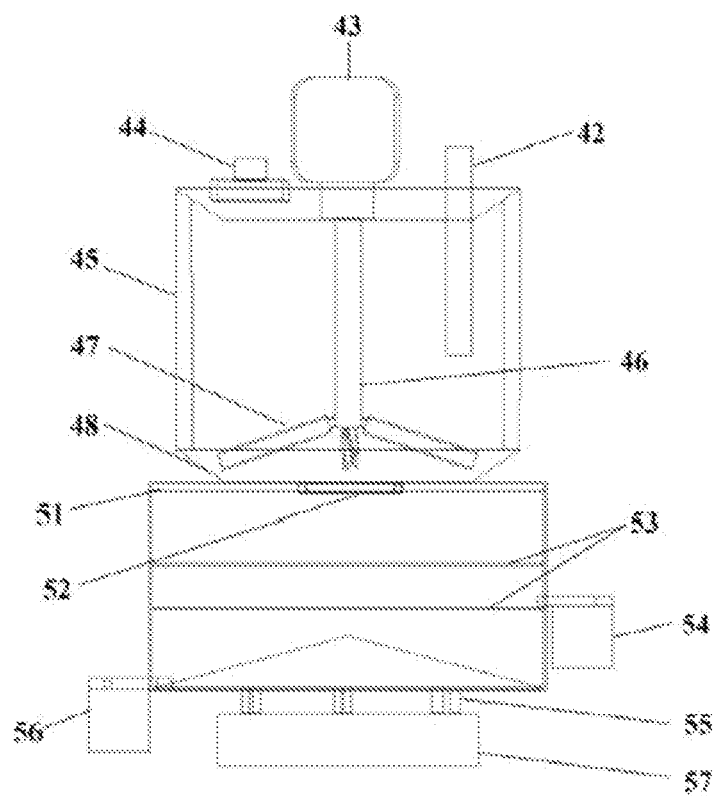
FIG. 3 is a structural diagram of a drying and sieving module according to the present disclosure.

As shown in FIG. 1 which is a structural diagram of a device according to the present disclosure, a three-degree-of-freedom convenient mobile powder recovery device provided by the present disclosure includes: a powder recovery module, a three-degree-of-freedom adjusting module and a drying and sieving module, wherein the powder recovery module is arranged on the three-degree-of-freedom adjusting module and used to recover powder; the three-degree-of-freedom adjusting module is used to adjust the position of the powder recovery module, so that the powder recovery module can transversely and/or longitudinally move in a horizontal plane and move up and down vertically in a vertical plane; and the drying and sieving module is arranged on the three-degree-of-freedom adjusting module, connected to the powder recovery module and used to dry and sieve powder recovered by the powder recovery module.

Specifically, the powder recovery module 1 is composed of an enclosing plate 11, a workbench 12 and a powder-collecting funnel 13, wherein the workbench is arranged in the enclosing plate; the powder-collecting funnel is arranged on a lower side of the workbench; the enclosing plate, the workbench and the powder-collecting funnel are connected by bolts; and the workbench is cross-shaped and convenient for powder to leak into the powder-collecting funnel, and can be changed or replaced with an orifice plate. First handles 14 are mounted at two ends of the enclosing plate; an anti-laser heat-resistant glass door 16 is arranged on a side part of the enclosing plate; and a connecting hose 17 or an adapter is arranged at the bottom of a first drawing bottom plate 15, which is arranged under the powder-collecting funnel 13, and the connecting hose 17 or an adapter is used to connect the powder recovery module 1 and the drying box 45 of the drying and sieving module. The enclosing plate 11 is made of some fully-transparent high-temperature-resistant materials, and the shape can be changed. The surfaces of the first drawing bottom plate 15, the enclosing plate 11 and the powder-collecting funnel 13 have high smoothness, and the collected powder can freely slide down after being in contact with these surfaces. In addition, the size of the enclosing plate 11 can be adjusted according to different equipment requirements.

The three-degree-of-freedom adjusting module has an aluminum profile structure, and includes a longitudinal lifting frame 3, a transverse telescopic frame 2 and a driving module. The transverse telescopic frame 2 and the longitudinal lifting frame 3 are connected by 12 guide connecting plates 33; one surface of each of the guide connecting plates 33 are fixed to a longitudinal sliding block 32 on a longitudinal sliding rail 34 arranged on the longitudinal lifting frame 3 by a bolt, and the other surface of each of the guide connecting plates 33 are fixed to the transverse telescopic frame 2 by a bolt; the 12 guide connecting plates all adopt this connection mode, so that the transverse telescopic frame 2 can freely slide up and down in the longitudinal sliding rail 34 of the longitudinal lifting frame 3 together with the longitudinal sliding block 34; specifically, H-shaped cross beams 23 and 38 are arranged on the longitudinal lifting frame 3 and the transverse telescopic frame 2; the driving module includes a first motor 36, a transmission rod 37 and a screw rod 35; the first motor 36 is mounted on the cross beam 38 of the longitudinal lifting frame 3; one end of the transmission rod 37 is connected to the first motor 36 and the other end of the transmission rod is connected to the screw rod 35; the transmission rod 37 is driven by the first motor 36 to rotate, and the center of the transmission rod 37 is used as a nut of the screw rod 35 and matched with the screw rod 35 so as to drive the screw rod 35 to do axial movement. One end of the screw rod 35 is connected to the transmission rod 37 and the other end of the screw rod 35 is fixed on the cross beam 23 of the transverse telescopic frame 2. During use, the first motor 36 and the transmission rod 37 drive the screw rod 35 to stretch out and draw back so as to push the transverse telescopic frame 2 to freely go up and down in the vertical direction. The lifting speed can be adjusted in a first motor control box 31. A scram button is arranged in the first motor control box 31, so that the recovery device can be stopped immediately in case of failure during use. The powder recovery module and a transverse sliding block 24 on a transverse sliding rail 22 arranged on the transverse telescopic frame 2 are connected by a bolt, so that the powder recovery module can slide along the direction of the transverse sliding rail 22 together with the transverse sliding block 24, and move along another direction by using a Foma wheel. At least four fixing rings 21 are mounted on the transverse sliding rail 22 of the transverse telescopic frame 2, and the powder recovery module is fixed by the fixing rings 21 after the transverse position is determined; and at least four horizontal adjusting knobs 25 are arranged below the transverse telescopic frame 2 and can perform fine adjustment on the longitudinal position of the powder recovery module, so that the powder recovery module is always located at the horizontal position during use. The three-degree-of-freedom adjusting module further includes a bottom plate; the transverse telescopic frame 2, the longitudinal lifting frame 3 and the drying and sieving module are placed on the bottom plate; and several Foma wheels are arranged at the bottom of the bottom plate, so that the three-degree-of-freedom convenient mobile powder recovery device is moveable. Specifically, four Foma wheels 6 are mounted at the bottom of the longitudinal lifting frame, so that the whole device can move along a direction perpendicular to the length of the transverse sliding rail 22 in the horizontal plane.

The three degrees of freedom are respectively as follows: the first motor 36 drives the transverse telescopic frame 2 to move on the sliding rail in the vertical direction; the first handle pushes the powder recovery module to move along the sliding rail in the horizontal direction; and the Foma wheels drive the whole device to move along the direction perpendicular to the length of the transverse sliding rail 22 in the horizontal plane.

The drying and sieving module includes a drying submodule and a sieving submodule; the drying submodule includes a drying box 4 placed on a bracket 41; the drying box is used to dry the collected powder conveyed by the powder recovery module; and the drying box is fixed on the three-degree-of-freedom adjusting module by an aluminum profile bracket. The drying box 4 includes a cylinder wall 45 and a powder inlet 44; an electrostatic eliminator 42, a second motor 43, and a stirring rod 46 and stirring blades 47 that are connected to the second motor are arranged in the cylinder wall 45; and an induction heating coil 48 is arranged at the lowermost of the cylinder wall of the drying box, that is, over a second drawing bottom plate 51. The electrostatic eliminator 42 is used to eliminate static electricity generated between powder for avoiding powder explosion. In the drying process, the second motor 43 drives the stirring blades 47 on a stirring rod 46 to stir powder, and thus the drying speed is increased; outer layers of the stirring rod 46 and the stirring blades 47 are coated with Teflon coatings, so that static electricity generated between the stirring rod 46 or the stirring blades 47 and the powder in the stirring process is avoided; the stirring rotating speed can be freely adjusted in the range of 0-100 r/min. The heating temperature of the induction heating coil 48 can be freely adjusted in the range of 0-150° C. The second drawing bottom plate 51 is arranged at the bottom of the drying box 4. After drying, the second drawing bottom plate 51 is pulled outward, so that the powder falls on a vibrating screen 5.

The sieving submodule includes the vibrating screen 5. The vibrating screen 5 is provided with a sieve 53, springs 55, a third motor 57, a powder outlet 56 and an impurity outlet 54, wherein the third motor 57 is located at the lowermost of the vibrating screen 5 and is connected to a main body of the vibrating screen 5 by springs 55; the vibrating sieve 53 is located below the drying box 4; the number of layers of the sieve 53 can be increased or reduced according to actual requirements; the impurity outlet 54 is located above the sieve 53; and the powder outlet 56 is located below the vibrating sieve 53.

A second handle 52 is arranged on the second drawing bottom plate 51. The third motor 57 is a vibrating motor. The number of layers and the pore diameter of the sieve 53 can be adjusted according to actual requirements. The sieve 53 can be replaced regularly, and the vibration frequency of the vibrating motor can be adjusted.

The present disclosure further provides a recovery method of the three-degree-of-freedom convenient mobile powder recovery device. The method is performed by the recovery device and includes the following steps:

S1: the height of the recovery device is adjusted according to the height and position of a laser melting deposition system required to recover powder, and a powder recovery module is adjusted to an appropriate position in a horizontal direction; then a workbench is adjusted to be located at a horizontal position, and a recovery operation is started;

S2: in the recovery process, the recovery device is stopped immediately in the case of abnormality; under the normal situation, powder is continuously collected, the powder recovery module is moved to be located over a drying and sieving module after collection, the powder is conveyed by the powder recovery module to a drying box of the drying and sieving module through a hose, and a second motor is turned on for stirring and drying; and S3: the stirred and dried powder is conveyed onto a sieve of a vibrating screen, the vibrating screen is adjusted to sieve the powder, and the sieved powder is allowed to flow out of a powder outlet for storage.

The specific use process is as follows: the height of the device is adjusted according to the height of the laser melting deposition system, and the device is pushed by a handle on a powder recovery bin to an appropriate position in the horizontal direction, and then the horizontal adjusting knobs are adjusted to make the workbench in a horizontal position for use. During use, the situation of the powder recovery bin is observed through a glass door. Stop immediately in case of abnormality. After the powder collection work is completed, the powder recovery bin is pushed to be located above the powder drying and sieving device; the powder inlet is opened, a connecting hose at the bottom of the powder recovery module is connected to the powder inlet of the drying box by adjusting an automatic lifting telescopic frame; the second drawing bottom plate is opened, and powder in the powder recovery module independently flows into the drying box. After the powder being moved to the drying box, the powder recovery module is moved to an appropriate position, the powder inlet of the drying box is closed, the motor is turned on to start stirring and drying. After drying, the drawing bottom plate is pulled outwards, so that powder falls on the sieve. After the powder falls into the vibrating screen, the vibration frequency of the vibrating screen is adjusted until sieving is completed. The impurity outlet is mainly used to remove large-sized powder or agglomerated particles that have not passed through the sieve, and the powder outlet is used to collect and store the sieved powder.

The above description shows several preferred embodiments of the present disclosure, but as described above, it should be understood that the present disclosure is not limited to the form disclosed herein and should not be regarded as an exclusion of other embodiments, but may be applied to various other combinations, modifications and environments and can be modified by the above teaching or technology or knowledge in the related field within the scope of the present application ideal described herein. However, the modifications and changes made by those skilled in the art do not depart from the spirit and scope of the present disclosure and should be within the protection scope of the appended claims of the present disclosure.

What is claimed is:

1. A three-degree-of-freedom convenient mobile powder recovery device, wherein, including a powder recovery module, a three-degree-of-freedom adjusting module and a drying and sieving module, wherein the powder recovery module is arranged on the three-degree-of-freedom adjusting module and used to recover powder;

the three-degree-of-freedom adjusting module is used to adjust the position of the powder recovery module, so that the powder recovery module is able to transversely and/or longitudinally move in a horizontal plane and move up and down vertically in a vertical plane; and the drying and sieving module is arranged on the three-degree-of-freedom adjusting module, connected to the powder recovery module and used to dry and sieve powder recovered by the powder recovery module.

2. The three-degree-of-freedom convenient mobile powder recovery device according to claim 1, wherein the powder recovery module includes an enclosing plate, a workbench and a powder-collecting funnel; the size of the enclosing plate is capable of being adjusted according to requirements; the workbench is arranged in the enclosing plate; and the powder-collecting funnel is arranged on a lower side of the workbench.

3. The three-degree-of-freedom convenient mobile powder recovery device according to claim 1, wherein the three-degree-of-freedom adjusting module includes a transverse telescopic frame, a longitudinal lifting frame and a driving module; the transverse telescopic frame and the longitudinal lifting frame are connected by several guide connecting plates; and the driving module is arranged on the longitudinal lifting frame.

4. The three-degree-of-freedom convenient mobile powder recovery device according to claim 3, wherein a sliding rail is arranged on the longitudinal lifting frame, and a sliding block is arranged in the sliding rail; one end of each of the guide connecting plates is fixedly connected to the sliding block, and the other end of each of the guide connecting plates is fixedly connected to the transverse telescopic frame; and a sliding rail is arranged on the transverse telescopic frame, a sliding block is arranged on the sliding rail, and the powder recovery module is connected to the sliding block, so that the powder recovery module moves along a direction of the sliding rail in the horizontal plane together with the sliding block.

5. The three-degree-of-freedom convenient mobile powder recovery device according to claim 3, wherein the driving module includes a first motor, a transmission rod and a screw rod; the first motor is arranged on the longitudinal lifting frame; one end of the transmission rod is connected to the first motor, and the other end of the transmission rod is connected to one end of the screw rod; and the other end of the screw rod is fixed on the transverse telescopic frame.

6. The three-degree-of-freedom convenient mobile powder recovery device according to claim 3, wherein at least four fixing rings are arranged on the sliding rail of the transverse telescopic frame and used to fix the powder recovery module to a certain horizontal position; and at least four horizontal adjusting knobs are arranged below the transverse telescopic frame and used to perform fine adjustment on the longitudinal position of the powder recovery module.

7. The three-degree-of-freedom convenient mobile powder recovery device according to claim 4, wherein the three-degree-of-freedom adjusting module further includes a bottom plate; the transverse telescopic frame, the longitudinal lifting frame and the drying and sieving module are placed on the bottom plate; and several Foma wheels are arranged at the bottom of the bottom plate, so that the three-degree-of-freedom convenient mobile powder recovery device is moveable along a direction perpendicular to the length of the sliding rail in the horizontal plane.

8. The three-degree-of-freedom convenient mobile powder recovery device according to claim 1, wherein the drying and sieving module includes a drying submodule and a sieving submodule; the drying submodule includes a drying box; a powder inlet, an electrostatic eliminator, a second motor, a stirring rod and stirring blades are arranged in the drying box, wherein, the upper end of the stirring rod is connected to the second motor, and the stirring blades are arranged at the lower end of the stirring rod; the sieving submodule includes a vibrating screen; a sieve, springs, a third motor, a powder outlet and an impurity outlet are arranged on the vibrating screen; the third motor is located at the lowermost part of the vibrating screen, and is connected to a main body of the vibrating screen by the spring; the sieve is located below the drying box; the impurity outlet is located above the sieve; and the powder outlet is located below the sieve.

9. The three-degree-of-freedom convenient mobile powder recovery device according to claim 1, wherein an induction heating coil is arranged in the drying box and used to heat powder.

10. A recovery method of the three-degree-of-freedom convenient mobile powder recovery device, being performed by the recovery device according to claim 1 and including the following steps:
  S1: adjusting the height of the recovery device according to the height and position of a laser melting deposition system required to recover powder, and adjusting a powder recovery module to the appropriate position in a horizontal direction; then adjusting a workbench to be located at a horizontal position, and starting a recovery operation;
  S2: in the recovery process, stopping the recovery device immediately in the case of abnormality; under the normal situation, continuously collecting powder, moving the powder recovery module to be located over a drying and sieving module after collection, conveying the powder by the powder recovery module to a drying box of the drying and sieving module through a hose, and turning on a second motor for stirring and drying; and
  S3: conveying the stirred and dried powder onto a sieve of a vibrating screen, adjusting the vibrating screen to sieve the powder, and allowing the sieved powder to flow out of a powder outlet for storage.

* * * * *